(12) United States Patent
Nikoloudis et al.

(10) Patent No.: US 10,981,100 B2
(45) Date of Patent: Apr. 20, 2021

(54) FILTER MODULE

(71) Applicant: Sartorius Stedim Biotech GmbH, Goettingen (DE)

(72) Inventors: Paschalis Nikoloudis, Goettingen (DE); Thomas Loewe, Goettingen (DE); Thomas Friese, Bleicherode (DE); Sebastian Handt, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 0 days.

(21) Appl. No.: 16/929,727

(22) Filed: Jul. 15, 2020

(65) Prior Publication Data

US 2020/0346159 A1    Nov. 5, 2020

Related U.S. Application Data

(63) Continuation of application No. PCT/EP2019/051626, filed on Jan. 23, 2019.

(30) Foreign Application Priority Data

Jan. 26, 2018  (DE) ..................... 10 2018 101 804.5

(51) Int. Cl.
*B01D 46/52* (2006.01)
*B01D 29/21* (2006.01)

(52) U.S. Cl.
CPC ........... *B01D 46/522* (2013.01); *B01D 29/21* (2013.01); *B01D 2201/122* (2013.01)

(58) Field of Classification Search
CPC . B01D 46/522; B01D 29/21; B01D 2201/122
See application file for complete search history.

(56) References Cited

U.S. PATENT DOCUMENTS

| 3,022,861 A | 2/1962 | Harms | |
|---|---|---|---|
| 2003/0024872 A1* | 2/2003 | Muzik | B01D 46/0031 210/457 |

(Continued)

FOREIGN PATENT DOCUMENTS

| DE | 102012022285 A1 | 5/2014 |
|---|---|---|
| EP | 159590 A1 | 11/2005 |

(Continued)

OTHER PUBLICATIONS

International Search Report, PCT/EP2019/051626, dated Apr. 2, 2020, 2 pages.

*Primary Examiner* — Benjamin M Kurtz
(74) *Attorney, Agent, or Firm* — Edell, Shapiro & Finnan, LLC (57) ABSTRACT

A filter module with a perforated inner tube (20) and a concentric, perforated outer tube (22), forming an interposed annular gap for a filter membrane (10) pleated into folds. The membrane folds (11, . . . ) are of different fold types with differing fold heights, extend from a respective fold edge (111, . . . ) resting against the outer tube towards the inner tube to the respective fold tip (114, . . . ) and are arranged along the circumference of the annular gap as groups of folds (11, . . . ) of different types. Each group has a mating fold (15) which extends from a mating fold edge (151) resting against the inner tube towards the outer tube to the mating fold tip (154). The height of the mating fold is no more than the difference between the width of the annular gap and the height of the fold type with the shortest height of the same group.

16 Claims, 8 Drawing Sheets

(56) References Cited

U.S. PATENT DOCUMENTS

| | | |
|---|---|---|
| 2010/0089819 A1 | 4/2010 | Hamlin et al. |
| 2010/0243554 A1 | 9/2010 | Herrin et al. |
| 2019/0217238 A1* | 7/2019 | Gehwolf .............. B01D 46/522 |

FOREIGN PATENT DOCUMENTS

| | | |
|---|---|---|
| JP | S6061017 A | 4/1985 |
| JP | S6417308 U | 1/1989 |
| JP | 2007050313 A | 3/2007 |
| SU | 436668 A1 | 7/1974 |
| WO | 2004028659 A1 | 4/2004 |

\* cited by examiner

FILTER MODULE

CROSS REFERENCE TO RELATED APPLICATIONS

This is a Continuation of International Application PCT/EP2019/051626 which has an international filing date of Jan. 23, 2019, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2018 101 804.5 filed on Jan. 26, 2018.

FIELD OF THE INVENTION

The invention relates to a filter module comprising a perforated inner tube and a perforated outer tube concentrically surrounding the inner tube, which tubes form between them an annular gap in which a filter membrane which is pleated into folds is arranged. The folds of this filter membrane, which are subdivided into plural fold types of differing fold height, extend from their respective fold edges, which abut against the outer tube, in the direction of the inner tube to their respective fold tip and are arranged—preferably in a periodic sequence—along the circumference of the annular gap as groups of folds of different fold types.

Filter modules of this type are known from US 2010/0089819 A1.

BACKGROUND

Generic filter modules are used in a very wide variety of industrial areas. During operation, liquid to be filtered is pumped substantially radially through the filter module. In particular, liquid can be pumped axially into the inner tube, which is closed at the outlet side, under positive pressure, from which inner tube the liquid passes through the perforations of the inner tube into the annular gap, passes through the filter membrane there and exits the filter module again through the perforations in the outer tube. In this case, the filter membrane, in terms of its properties, is matched to the respective filtration task, and may be configured for example as a film, as a porous membrane, as a nonwoven, as a fabric, as a mixture thereof or in a similar manner with one or more layers. All of these configurations, which are not relevant to the present invention, are to be combined here under the term filter membrane. What is decisive for the service life of a filter module—that is to say essentially for the total volume which can be filtrated before the filter becomes significantly less effective owing to filtration deposits and has to be replaced or regenerated—is the total area of the filter membrane that is accessible within the provided space of the annular gap. The known pleating arrangement of the filter membrane serves for maximizing the area thereof within the annular gap.

The cited document uses a periodic pattern of folds of differing fold height for the purpose of pleating. In this case, use is made of the fact that the space available in a circumferential direction increases from the inner wall of the annular gap to the outer wall thereof. In the present context, a fold is to be understood as meaning a symmetrical structure which is formed by bending the filter membrane and which extends from a fold opening, formed by two fold edges extending axially in the annular gap, to the fold tip thereof, formed by the bend. In generic filter modules, the fold edges of all the folds abut against the outer tube; owing to the differing fold heights, the fold tips project radially inward into the annular gap to different extents. The fold tips of the folds of that fold type having the largest fold height extend until they abut against the inner tube. The folds of those fold types having smaller fold height end, with their fold tips, at differing radii between the inner tube and the outer tube. Each fold, at each radius within its extent region, occupies in a circumferential direction a space which corresponds to at least twice the filter membrane thickness. Those folds which do not pass radially through the entire annular gap self-evidently do not occupy any space in a circumferential direction in the region between their fold tip and the inner tube. By staggering folds of different fold type, that is to say of differing fold height, it is possible—according to the approach of the generic document—for the space available in a circumferential direction to be filled almost optimally for each radius. Folds of different fold type are therefore grouped into groups having a specific pattern, that is to say a specific sequence of differing fold lengths, with the groups being repeated periodically in a circumferential direction.

WO 2004/028659 A1, and also EP 1 595 590 A1, JPS6417308 U and JPS6061017 A, follow the same concept too.

A disadvantage with the known pleating arrangements is a utilization of space which is actually sub-optimal. For thick filter membranes in particular, the addition of an additional fold of small fold height leads to the fold tips of those folds having the largest fold height, that is to say a fold height which projects as far as the inner tube, abruptly moving apart. Those regions of the interior which are close to the inner tube are no longer optimally filled. This can be remedied through the use of folds with excess length, that is to say through the use of folds whose fold height is larger than the width of the annular gap. The folds with excess length are compressed in the region of their fold tips during the insertion into the annular gap and curve in the manner of a bulge in a circumferential direction. It is alternatively also known, in particular from the aforementioned generic document, to introduce the pleated filter membrane into the annular gap using torsional forces such that the folds are bent in the manner of a C-shaped bend, in order in this way to create space even for the folds with excess length. However, both approaches complicate the insertion of the pleated filter membrane into the annular gap; in particular, the use of special machines is essential.

Furthermore, J P 2007-050313 has disclosed a fold-type filter cartridge whose filter material is pleated into folds and counter-folds, the latter extending according to the reverse arrangement, that is to say from their respective fold edges, which are in abutment radially at the inside, radially outwardly to their respective fold tip. In this case, the tips of the folds and counter-folds overlap in order, in this way, to prevent the folds from bending. This known pleating arrangement, too, does not optimally utilize the available space.

SUMMARY

It is an object of the present invention to provide a pleating arrangement for filter membranes, which are able to be easily inserted into the annular gap with an improved utilization of space.

This and other objects are achieved with a filter module in which each group of folds has a/at least one counter-fold, wherein said (at least one) counter-fold extends from its counter-fold edges, which abut against the inner tube, in the direction of the outer tube to its counter-fold tip and is of a fold height that is less than or equal to the difference between the width of the annular gap and the fold height of the fold type of smallest fold height of the same group.

According to one important aspect of the invention, at least one additional counter-fold is provided in each of the—preferably periodically repeating—fold groups. In the present context, a counter-fold is to be understood as meaning a symmetrical structure which is formed by bending the filter membrane and which extends from a counter-fold opening, formed by two counter-fold edges extending axially in the annular gap and abutting against the inner tube, to the counter-fold tip thereof, formed by the bend. Put simply, a counter-fold could thus be described as being a fold arranged in the reverse manner and extending from radially at the inside radially outward; in the present context, however, a conceptual distinction is to be made between folds on the one hand and counter-folds on the other. Folds extend from radially at the outside in a direction radially inward. By contrast, counter-folds extend from radially at the inside in a direction radially outward.

Folds and counter-folds are self-evidently formed by bending of the same filter membrane. Each counter-fold arranged adjacent to a fold must therefore be connected to the latter via a filter membrane section. According to the definition used here, each individual fold ends in a circumferential direction at its fold edges, which abut against the outer tube, and each counter-fold ends in a circumferential direction at its counter-fold edges, which abut against the inner tube. The filter membrane section, which connects a counter-fold edge to the fold edge which is the closest neighbor thereof in a circumferential direction, is to be referred to here as a bridge section and is itself assigned neither to a fold nor a counter-fold.

The invention allows that space close to the inner tube which is formed by the introduction of folds of submaximal length to be filled with a filter membrane without, for this purpose, having to resort to the use of folds with excess length, which make it more difficult for the pleated filter membrane to be inserted into the annular gap. Consequently, the result is an improved utilization of space with insertion of the pleated arrangement into the annular gap being simultaneously simplified.

This overarching concept for the counter-fold can be realized in practice in different ways, with the different embodiments having differing advantages.

Firstly, different families of embodiments can be distinguished on the basis of the number of different fold types, that is to say differing fold heights, used in each case. Embodiments having two, three or four fold types have proven to be advantageous in practical use. The corresponding families of embodiments are to be referred to here as 2-fold-type family, as 3-fold-type family and as 4-fold-type family, respectively.

In the embodiments of the 2-fold-type family, it is provided that the folds are subdivided into two fold types of differing fold height, specifically a relatively large first fold height and a relatively small second fold height. The advantage of the use of only two fold types (in addition to the counter-fold) lies in the particularly simple design and control of the pleating machine required for this purpose.

In the case of the 3-fold-type family, it is provided that the folds are subdivided into three fold types of differing fold height, specifically a largest first fold height, a medium second fold height and a smallest third fold height. Although such embodiments require a relatively complex configuration of the folding behavior or of the pleating machine used for folding, they allow an even better utilization of space within the annular gap owing to a relatively fine graduation of the fold heights.

An even finer graduation can be achieved by way of embodiments of the 4-fold-type family, for which it is provided that the folds are subdivided into four fold types of differing fold height, specifically a largest first fold height, a relatively large medium second fold height, a relatively small medium third fold height and a smallest fourth fold height.

Expediently, the fold tips of the shortest folds and the counter-fold tips are situated within an annular gap of a width of 10%, preferably 5%, of the entire width of the annular gap around the virtual circle, referred to here as the central circle, which is situated centrally, that is to say equidistantly between the outer tube and the inner tube. Here, the fold tips of the shortest folds and the counter-fold tips end at the same radius, or preferably a radial spacing between the fold tips of the shortest folds and the counter-fold tips is maintained. Specifically, in the fitted state, the folds are compressed in a circumferential direction, with the result that, with maintenance of this radial spacing, no material blockage in the region of the tips occurs, but rather short folds and counter-folds can become snugly arranged in a spatially optimized manner radially one below the other (with corresponding undulation of the bridge sections situated between the counter-fold and the immediately neighboring folds thereof). In relation to the individual group, this radial spacing specification may be formulated in a generally applicable manner so that the height of the counter-fold of each group is equal to or less than the difference between the width of the annular gap and the fold height of the fold type of smallest fold height of the same group.

With regard to the height of the fold of the longest folds (first fold type), it is preferred for all embodiments that it is larger than half the annular gap width. It may—likewise for all embodiments—be configured to be so large that the fold tip thereof abuts against the inner tube. However, it is also entirely possible for it to be configured to be smaller. In this case, the height thereof is preferably 85 to 95% of the width of the annular gap. Although a fold height dimensioned to be larger than the annular gap width, which would lead to a compression or curving of the long folds during insertion of the pleated membrane into the annular gap, is not excluded from being within the scope of the present invention, it would unnecessarily conflict with the objective thereof of simplifying the insertion process and is therefore at least not preferred.

With regard to the dimensioning of the counter-folds, it is provided that their height is less than the width of the annular gap, preferably 40 to 60%, particularly preferably 45 to 55%, of the width of the annular gap. Preferably, all the counter-folds of a pleated membrane have the same height.

Within the 2-fold-type family, various fold patterns have proven to be particularly advantageous. It is preferably provided that, in a circumferential direction of the annular gap, the fold and counter-fold arrangement within each group has the following sequence: a fold of a first fold type, a fold of a second fold type, a counter-fold, a fold of the second fold type. Thus, in this embodiment, each group of folds contains exactly three folds and one counter-fold, with the counter-fold being flanked on both sides by in each case one short fold (second fold type). Both the counter-fold and the two short folds preferably project, with their tips, as far as approximately the center of the annular gap.

In another embodiment within the 2-fold-type family, it is provided that, in a circumferential direction of the annular gap, the fold and counter-fold arrangement within each group has the following sequence: a fold of a second fold type, a fold of a first fold type, a counter-fold, a fold of the first fold type. In this embodiment too, each group of folds contains exactly three folds and one counter-fold, with the counter-fold however being flanked by two long folds (first fold type). The fold tips thereof preferably do not project all the way to the inner tube. However, they preferably significantly overlap the counter-fold in a radial direction.

In a further embodiment of the 2-fold-type family, it is provided that, in a circumferential direction of the annular gap, the fold and counter-fold arrangement within each group has the following sequence: a fold of a second fold type, a fold of a first fold type, a counter-fold. This embodiment represents that variant within the 2-fold-type family having the smallest number of folds per group. In relation to the entire pleated membrane, this embodiment leads to the largest number of counter-folds.

Within the 3-fold-type family too, various configurations of fold patterns are possible within the groups. In a preferred embodiment, it is provided that, in a circumferential direction of the annular gap, the fold and counter-fold arrangement within each group has the following sequence: a fold of a first fold type, a counter-fold, a fold of a third fold type, a fold of a second fold type. The fold height of the long fold (first fold type) is preferably dimensioned here such that the fold tip thereof abuts against the inner tube. The fold height of the medium-length fold (second fold type) is preferably dimensioned such that it shows a significant radial overlap with the counter-fold. The fold height of the short fold (third fold type) is preferably configured such that it does not overlap the counter-fold, there particularly preferably being a radial spacing between the fold tip of this short fold and the counter-fold tip. In the stated embodiment, each group contains the minimum possible number of folds within the 3-fold-type family. Correspondingly, the number of counter-folds in the entire pleated membrane is maximized. A particularly preferred modification of this folding scheme has a further short fold between each long fold and the closest neighboring medium-length fold thereof. In other words, it is provided here that, in a circumferential direction of the annular gap, the fold and counter-fold arrangement within each group has the following sequence: a fold of a first fold type, a counter-fold, a fold of a third fold type, a fold of a second fold type, a fold of the third type.

In another preferred embodiment within the 3-fold-type family, it is provided that, in a circumferential direction of the annular gap, the fold and counter-fold arrangement within each group has the following sequence: a fold of a second fold type, a fold of a third fold type, a counter-fold, a fold of the third fold type, a fold of a first fold type. In this embodiment, the counter-fold is flanked on both sides by a short fold (third fold type). With regard to preferred dimensionings, what has been said in relation to the above-described embodiment applies.

One variant has proven to be a further expedient embodiment within the 3-fold-type family, in which variant, in a circumferential direction of the annular gap, the fold and counter-fold arrangement within each group has the following sequence: a fold of a second fold type, a fold of a third fold type, a fold of a first fold type, a fold of the third fold type, a counter-fold. In particular within the dimensioning which is particularly preferred for this embodiment, according to which dimensioning the fold height of the long fold (first fold type) is less than the total width of the annular gap, with this embodiment, a particularly fine staggering of fold lengths is possible, this being advantageous in particular for large inner tube diameters and a relatively narrow annular gap. Specifically here, the differences in circumference of the inner and outer tubes are particularly small, with the result that the introduction of an additional fold in the radially outer region leads to a considerable gap in the radially inner region, which makes a fine staggering of the space filling for the differing radii necessary or at least advantageous.

Within the 4-fold-type family, it may preferably be provided that, in a circumferential direction of the annular gap, the fold and counter-fold arrangement within each group has the following sequence: a fold of a second fold type, a fold of a third fold type, a fold of a first fold type, a fold of a fourth fold type, a counter-fold. This embodiment therefore differs from the last-described embodiment of the 3-fold-type family merely by a splitting of the shortest fold type of the latter into two fold types, specifically the third and fourth fold types. The resulting staggering becomes correspondingly finer.

A person skilled in the art will understand that the stated fold patterns do not require a specific reading direction or a specific starting point within the entire pleated membrane. Enumeration of the individual fold types in an inverted or cyclically permutated order would in a literal sense be identical to the definitions selected here. A person skilled in the art will also understand that, for the formation of the entire pleated membrane, groups having different fold patterns may be combined.

Further features and advantages of the invention will emerge from the following specific description and the drawings.

DETAILED DESCRIPTION

Identical reference signs in the figures indicate identical or analogous elements.

FIGS. 1 to 8 show, in a schematic representation, fold patterns within different embodiments of in each case one fold group. For the formation of the entire pleated membrane, such groups or combinations of groups are positioned one after the other in a preferably periodic sequence. FIGS. 9 to 12 show, in a realistic representation, details of the entire pleated membrane in the compressed final fitting position, inserted into an annular gap between two tubes (inner and outer tube, not represented separately) of a filter module according to the invention, thereof.

The schematic representations in FIGS. 1 to 8 are all to be read as follows: What is represented in each case is a filter membrane 10 between an inner tube 20 and an outer tube 22, which are represented in developed, that is to say straightened, form in FIGS. 1 to 8. The central circle 24 which runs centrally, that is to say with an equal spacing, between the inner tube 20 and the outer tube 22, is represented by a dot-dashed line. The reference lines represented in dashed form mark the tip circles, that is to say they serve for illustrating the radial position of the fold or counter-fold tips, and are denoted by Roman numerals I, II, III, IV, according to the respective fold type, or by G, as a reference to the counter-fold. Here, 11 denotes a fold of a first fold type, 12 denotes a fold of a second fold type, 13 denotes a fold of a third fold type, 14 denotes a fold of a fourth fold type and 15 denotes a counter-fold. Particular regions of the folds 11, 12, 13, 14 and counter-folds 15 are denoted by three-digit Arabic numerals, whose first two digits in each case denote the fold 11, 12, 13, 14 or counter-fold 15 in question and whose third digit specifies the particular region. In this case, xx1 means (counter-)fold opening, xx2 means (counter-)fold edge, xx3 means (counter-)fold flank and xx4 means (counter-)fold tip. The bridge sections between a counter-fold 15 and a closest neighboring fold 11, 12, 13, 14 thereof are denoted by 16.

All the folds 11, 12, 13, 14 extend from the outer tube 22 in the direction of the inner tube 20 into the annular gap formed between the two tubes. The counter-folds 15 extend in the opposite direction, from the inner tube 20 toward the outer tube 22 into the annular gap. All the folds 11, 12, 13, 14 begin, according to the definition used here, at their respective fold opening 111, 121, 131, 141, which is formed between two fold edges 112, 122, 132, 142 abutting against the outer tube 22, run along their fold flanks 113, 123, 133, 143 and end at their respective fold tip 114, 124, 134, 144. The counter-folds 15 begin, according to the definition used here, at their respective counter-fold opening 151, which is formed between two counter-fold edges 152 abutting against the inner tube 20, run along their counter-fold flanks 153 and end at their respective counter-fold tip 154.

Figure 1:
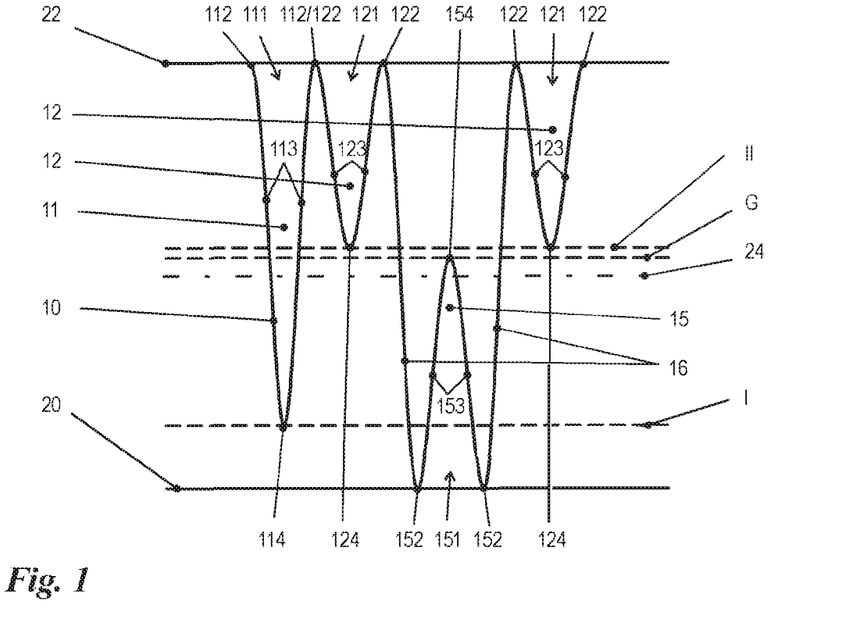
FIG. 1 shows a schematic representation of the fold pattern within a group in a first embodiment of the 2-fold-type family.

FIG. 1 shows a preferred embodiment of the 2-fold-type family. The filter membrane 10 has folds of two types, specifically long folds 11 of a first fold type and short folds 12 of a second fold type. The counter-folds 15 are each flanked by two short folds 12. The counter-fold edges 152 are connected to the circumferentially closest neighboring fold edges 122 via the bridge sections 16. The dimensioning of the fold heights is selected such that the fold tips 114 of the long folds 11 project significantly beyond the central circle 24, but not as far as the inner tube 20. The fold tips 124 of the short folds 12 do not project all the way to the central circle 24. The counter-fold tips 154, by contrast, project slightly beyond the central circle 24, but are situated radially spaced apart from the fold tips 124 of the short folds 12.

Figure 9:
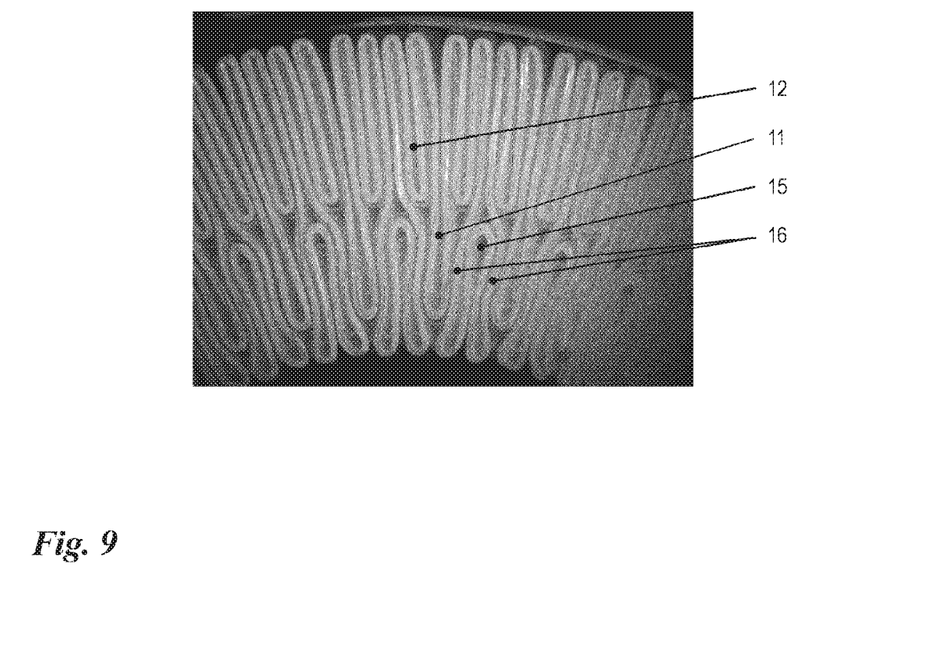
FIG. 9 shows a realistic representation of a detail of a pleated membrane which is folded according to the scheme in FIG. 1.

FIG. 9 presents a photograph of a pleated membrane in a fitted position in a filter module according to the invention, which pleated membrane is folded according to the folding scheme in FIG. 1.

Figure 2:
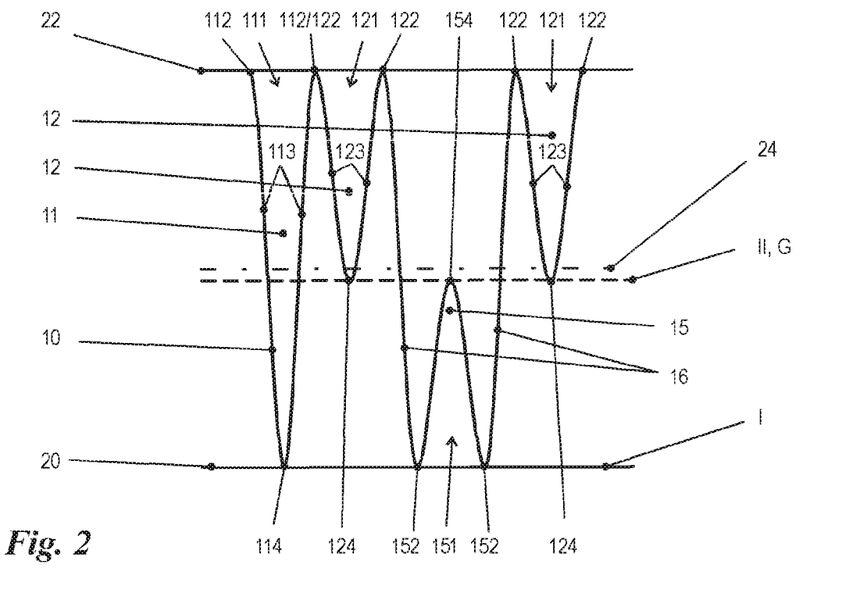
FIG. 2 shows a schematic representation of the fold pattern within a group in a second embodiment of the 2-fold-type family.

The folding scheme in FIG. 2 differs from that in FIG. 1 in four features: firstly, the fold tips 114 of the long folds 11 project as far as the inner tube 20; secondly, the fold tips 124 of the short folds 12 project beyond the central circle 24; thirdly, the counter-fold tips 154 do not project up to the central circle 24; and fourthly, no radial spacing is left between the fold tips 124 of the short folds 12 and the counter-fold tips 154.

Figure 3:
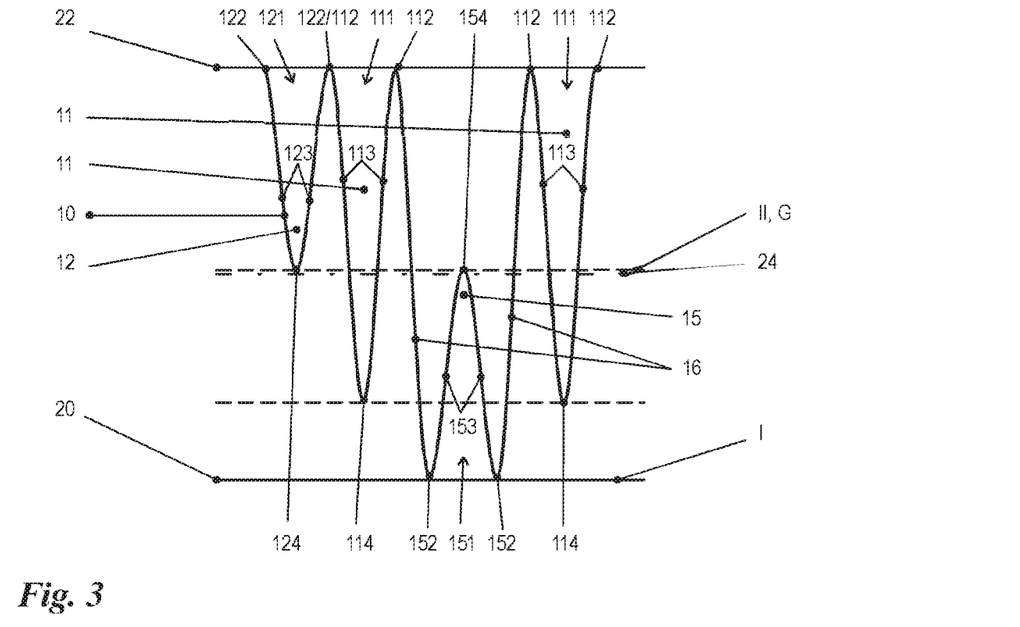
FIG. 3 shows a schematic representation of the fold pattern within a group in a third embodiment of the 2-fold-type family.

FIG. 3 shows a further embodiment of the 2-fold-type family. Here, the counter-folds 15 are each flanked by two long folds 11. The fold tips 124 of the short folds 12 end at the same radius as the counter-fold tips 154. Otherwise, reference may be made to the explanation for FIG. 1.

Figure 4:
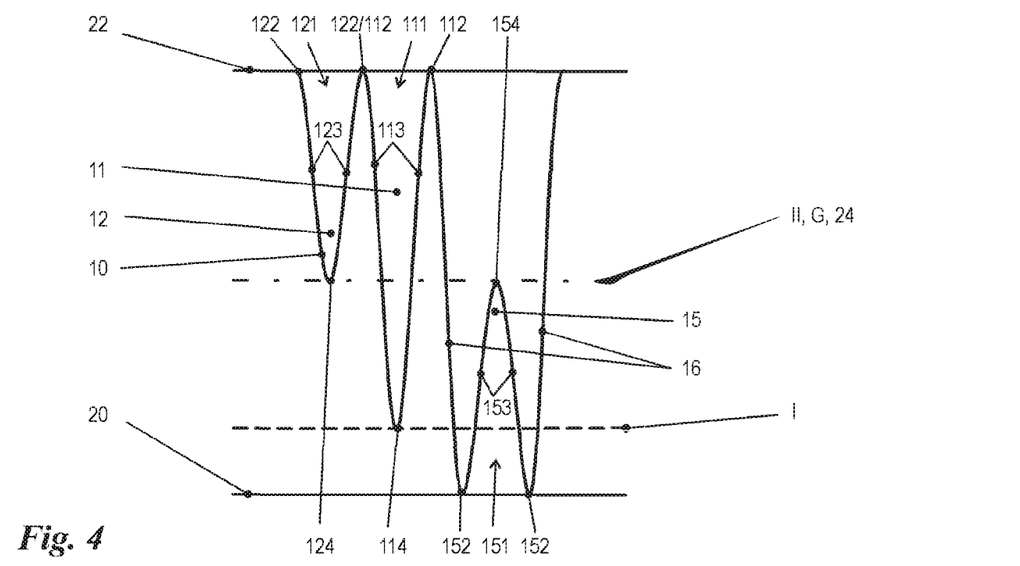
FIG. 4 shows a schematic representation of the fold pattern within a group in a fourth embodiment of the 2-fold-type family.
Figure 11:
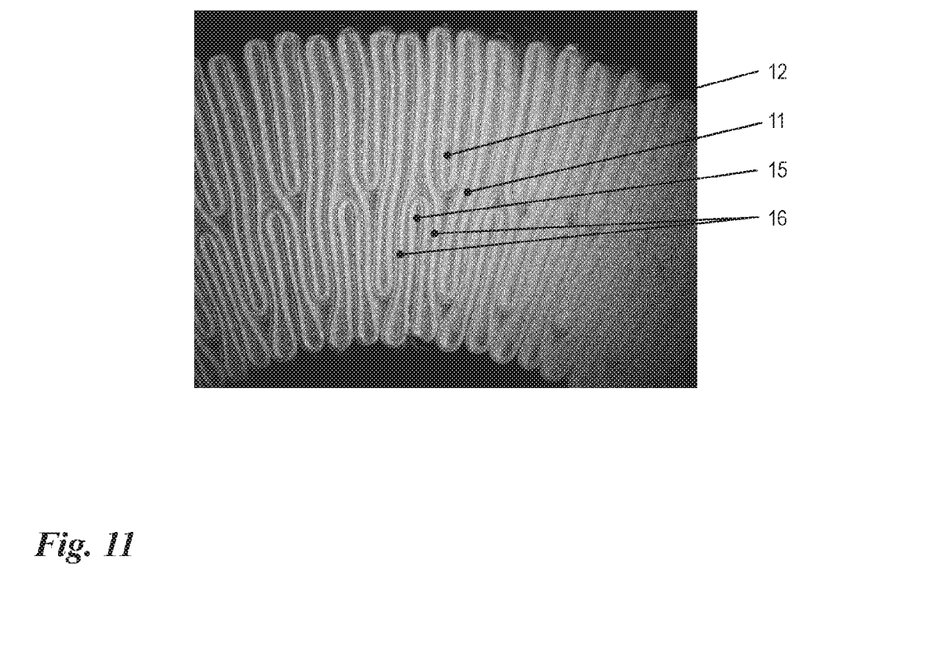
FIG. 11 shows a realistic representation of a detail of a pleated membrane which is folded according to the scheme in FIG. 4.

FIG. 4 shows a further embodiment of the 2-fold-type family. This differs from the embodiment according to FIG. 3 by the omission of a second long fold 11 per group (on the right-hand side next to the respective counter-fold 15). This variant maximizes, within the 2-fold-type family, the number of counter-folds 15 provided in the entire pleated membrane, since the total number of folds 11, 12 per group is minimized to two. FIG. 11 shows a photograph of a corresponding pleated membrane in a fitted position.

Figure 5:
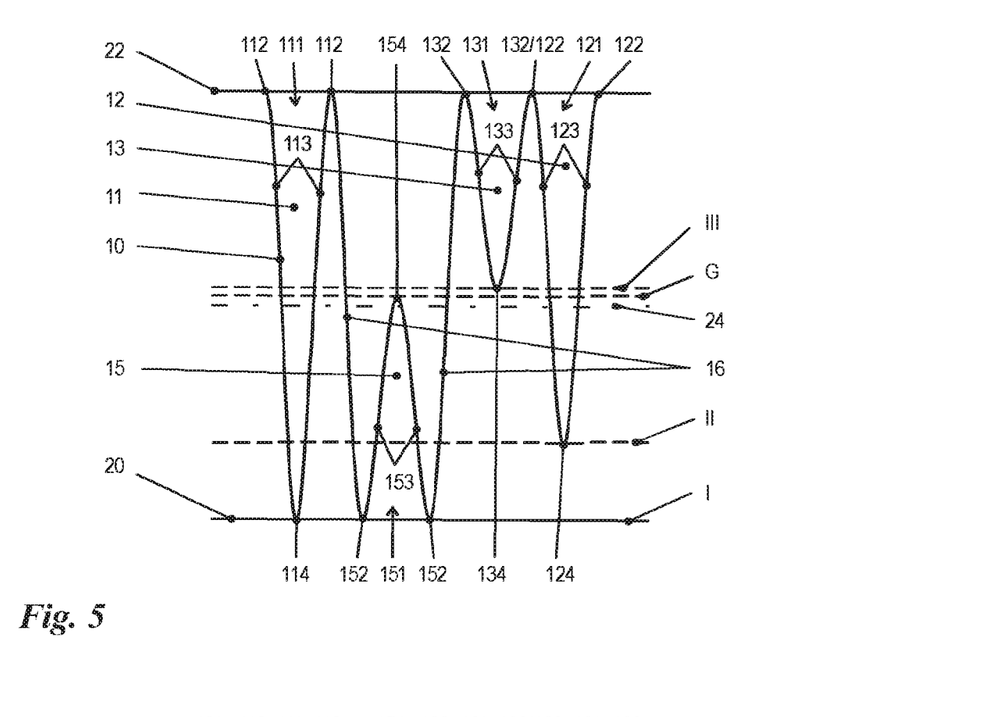
FIG. 5 shows a schematic representation of the fold pattern within a group in a first embodiment of the 3-fold-type family.
Figure 5A:
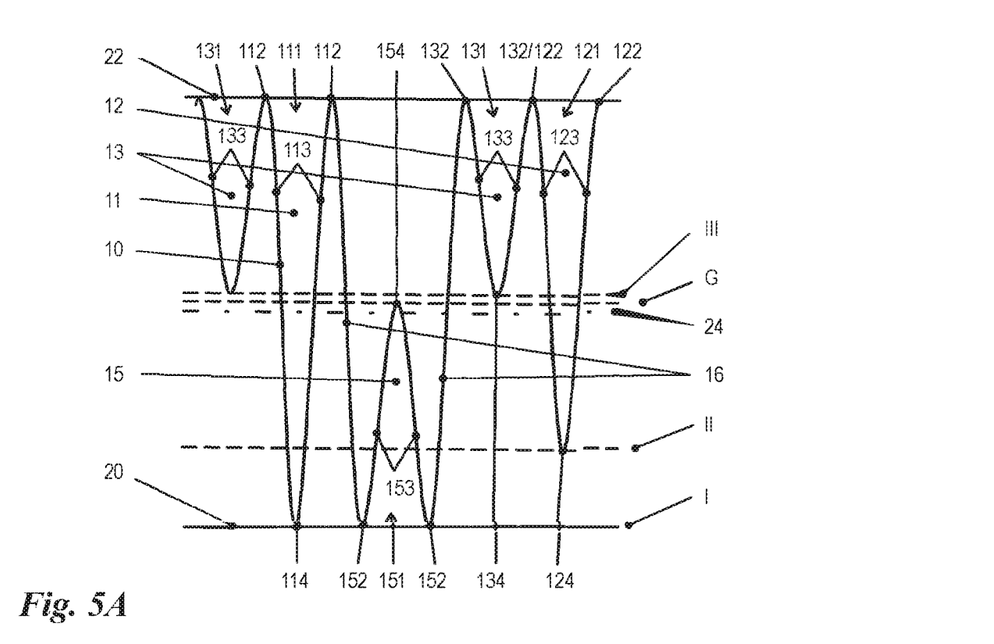
FIG. 5A shows a schematic representation of a modification of the embodiment in FIG. 5.
Figure 12:
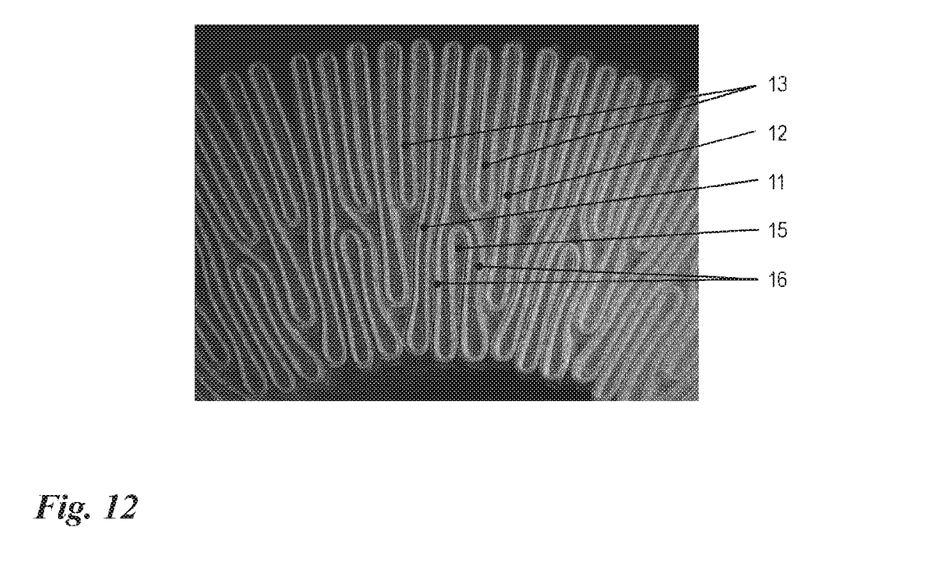
FIG. 12 shows a realistic representation of a detail of a pleated membrane which is folded according to the scheme in FIG. 5A.

FIG. 5 shows a preferred embodiment of the 3-fold-type family. The filter membrane 10 has folds of three types, specifically long folds 11 of a first fold type, medium-length folds 12 of a second fold type and short folds 13 of a third fold type. The counter-folds 15 are each flanked by a long fold 11 and a short fold 13. The counter-fold edges 152 are connected to the circumferentially closest neighboring fold edges 112 and 132 via the bridge sections 16. The dimensioning of the fold heights is selected such that the fold tips 124 of the medium-length folds 12 project significantly beyond the central circle 24, but not as far as the inner tube 20. The fold tips 114 of the long folds 11 project as far as the inner tube 20, against which they abut. The fold tips 134 of the short folds 13 do not project all the way to the central circle 24. The counter-fold tips 154, by contrast, project slightly beyond the central circle 24, but are situated radially spaced apart from the fold tips 134 of the short folds 13. This variant maximizes, within the 3-fold-type family, the number of counter-folds 15 provided in the entire pleated membrane, since the total number of folds 11, 12, 13 per group is minimized to three. FIG. 5A and FIG. 12 show a very similar folding scheme, in which, however, a further short fold 13 is situated between each long fold 11 and the closest neighboring medium-length fold 12 thereof.

Figure 6:
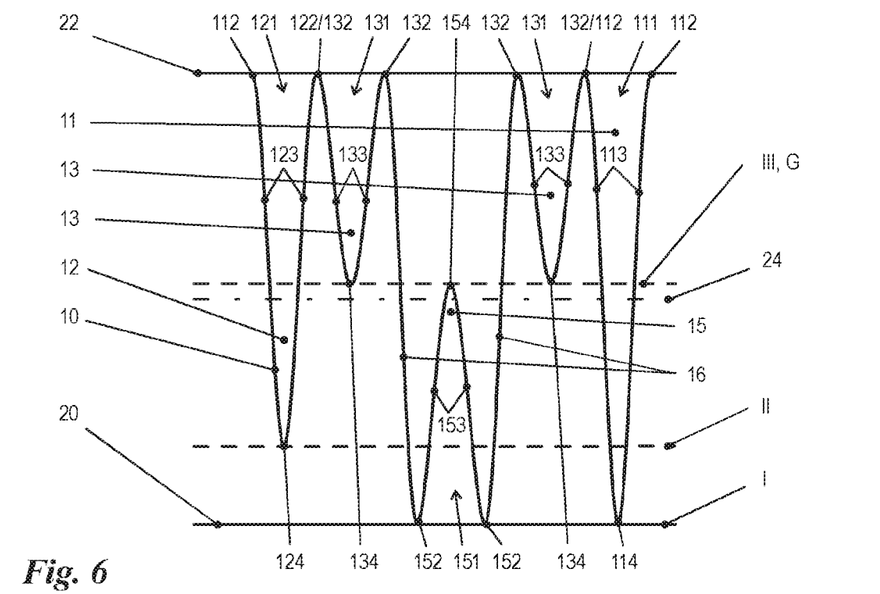
FIG. 6 shows a schematic representation of the fold pattern within a group in a second embodiment of the 3-fold-type family.

The folding scheme in FIG. 6 differs from that in FIG. 5 substantially in that the counter-folds 15 are each flanked by two short folds 13, which each have a neighboring medium-length fold 12 and a neighboring long fold 11. The dimensioning of the fold heights corresponds to that in FIG. 5, with the exception that the counter-fold tips 154 and the fold tips 134 of the short folds 13 are situated at the same radius.

Figure 7:
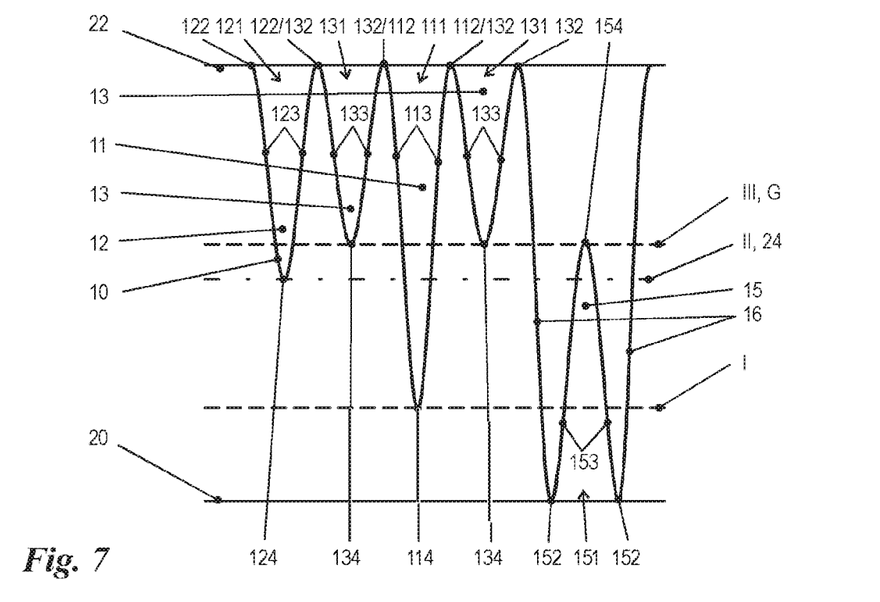
FIG. 7 shows a schematic representation of the fold pattern within a group in a third embodiment of the 3-fold-type family.
Figure 13:
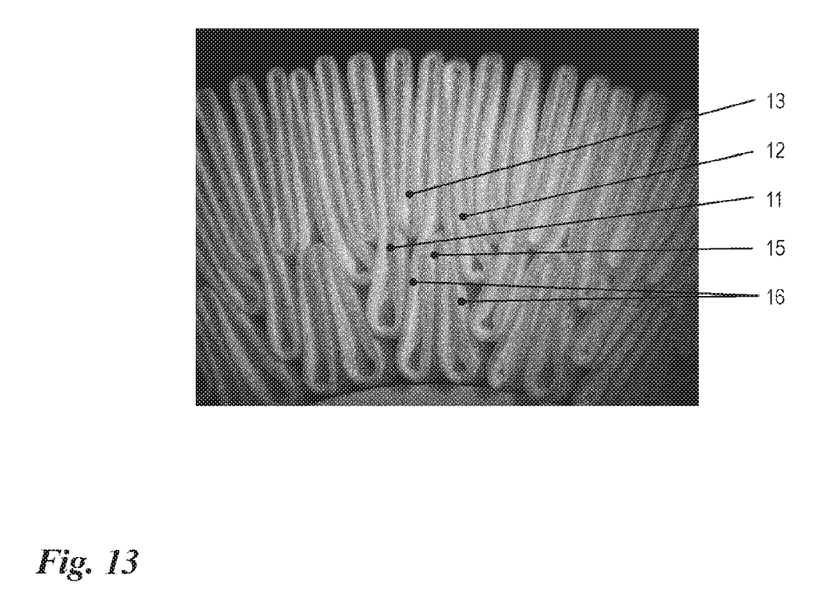
FIG. 13 shows a realistic representation of a detail of a pleated membrane which is folded according to the scheme in FIG. 7.

In the embodiment in FIG. 7, which is likewise assigned to the 3-fold-type family, an even finer graduation is achieved in that even the long folds 11 do not project as far as the inner tube 20. The medium-length folds 12 project only as far as the central circle 24. The counter-folds 15 are each flanked by a short fold 13 and a medium-length fold 12. Otherwise, reference may be made to what has been said above with regard to FIG. 6. FIG. 13 shows a photograph of corresponding pleated material in a fitted position.

Figure 8:
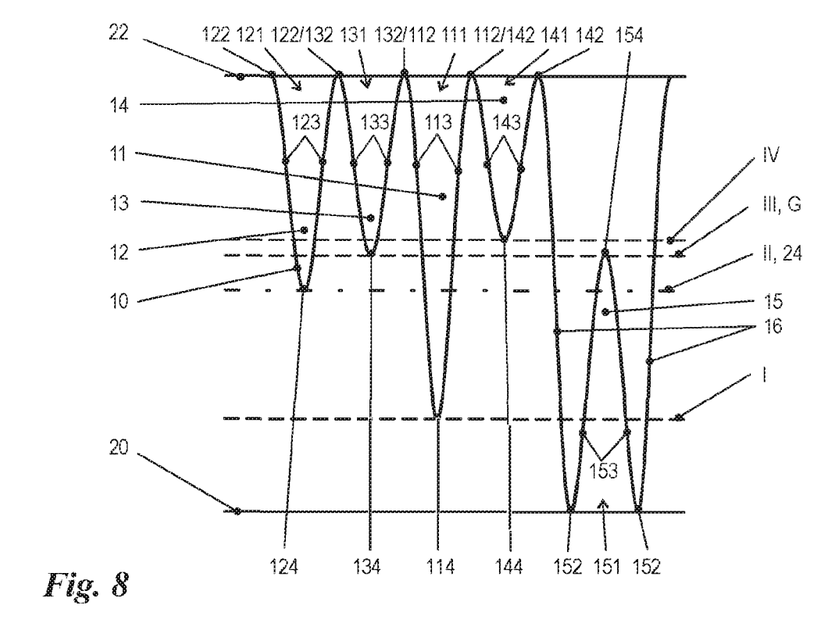
FIG. 8 shows a schematic representation of the fold pattern within a group in an embodiment of the 4-fold-type family.
Figure 10:
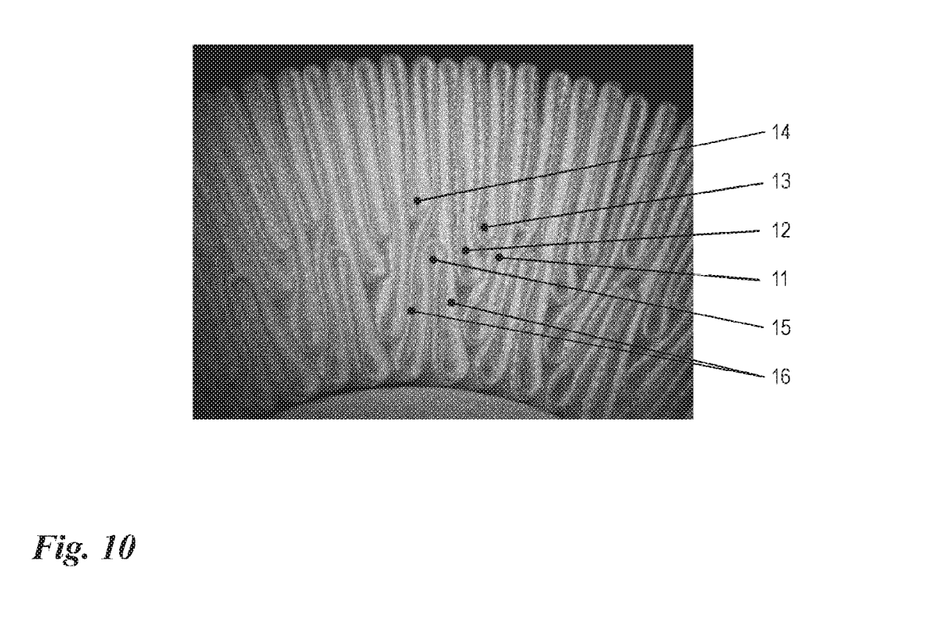
FIG. 10 shows a realistic representation of a detail of a pleated membrane which is folded according to the scheme in FIG. 8.

FIG. 8 shows a preferred embodiment of the 4-fold-type family. The filter membrane 10 has folds of four types, specifically long folds 11 of a first fold type, relatively long medium-length folds 12 of a second fold type, relatively short medium-length folds 13 of a third fold type and short folds 14 of a fourth fold type. This embodiment differs from the embodiment in FIG. 7 substantially by a splitting of the short folds 13 there into the short folds 14 here and the relatively short medium-length folds 13. The counter-folds 15 are each flanked by a short fold 14 and a relatively long medium-length fold 12. The counter-fold edges 152 are connected to the circumferentially closest neighboring fold edges 142 and 122 via the bridge sections 16. The dimensioning of the fold heights is selected such that the fold tips 124 of the relatively long medium-length folds 12 project as far as the central circle 24. The fold tips 114 of the long folds 11 project significantly beyond the central circle 24, but not as far as the inner tube 20. The counter-fold tips 154 project likewise beyond the central circle 24, are situated at the same radius as the fold tips 134 of the relatively short medium-length folds 13 and are radially spaced apart from the fold tips 144 of the short folds 14. This variant maximizes, within the 4-fold-type family, the number of counter-folds 15 provided in the entire pleated membrane, since the total number of folds 11, 12, 13, 14 per group is minimized to four. FIG. 10 shows a photograph of this folding scheme.

The embodiments discussed in the specific description and shown in the figures represent merely illustrative exemplary embodiments of the present invention. In the light of the disclosure here, a person skilled in the art is offered a broad spectrum of possible variants. In particular, the fold patterns presented in FIGS. 1 to 8 may also be realized in an inverted and/or cyclically permutated manner. Also, for the formation of an entire pleated membrane, the combination of mutually differing fold patterns is feasible.

LIST OF REFERENCE SIGNS

10 Filter membrane
11 Folds of first type, long folds
111 Fold opening of 11
112 Fold edge of 11
113 Fold flank of 11
114 Fold tip of 11
12 Folds of second type
121 Fold opening of 12
122 Fold edge of 12
123 Fold flank of 12
124 Fold tip of 12
13 Folds of third type
131 Fold opening of 13
132 Fold edge of 13
133 Fold flank of 13
134 Fold tip of 13
14 Folds of fourth type
141 Fold opening of 14
142 Fold edge of 14
143 Fold flank of 14
144 Fold tip of 14
15 Counter-fold
151 Counter-fold opening of 15
152 Counter-fold edge of 15
153 Counter-fold flank of 15
154 Counter-fold tip of 15
16 Bridge section
20 Inner tube
22 Outer tube
24 Central circle
I, II, III, IV Tip circles of 114, 124, 134, 144
G Tip circle of 154

What is claimed is:

1. A filter module comprising:
a perforated inner tube and a perforated outer tube concentrically surrounding the inner tube, wherein the inner tube and the outer tube form an annular gap there between; and
a filter membrane which is pleated into a periodically repeating sequence of fold groups arranged along a circumference of the annular gap,
wherein each fold group has folds subdivided into plural folds of different fold types having mutually differing fold height, extend from respective edges of the folds, which abut against the outer tube, inward towards the inner tube to respective tips of the folds, and
wherein each fold group has a counter-fold that extends from edges of the counter-fold, which abut against the inner tube, outward towards the outer tube, to a respective tip of the counter-fold, and that has a fold height that is less than or equal to a difference between a width of the annular gap and a fold height of a fold type that has a smallest fold height within the fold group.

2. The filter module as claimed in claim 1,
wherein the folds are subdivided into two fold types of mutually differing fold height to form a fold and counter-fold arrangement.

3. The filter module as claimed in claim 2,
wherein the two fold types of mutually differing fold height consist of a relatively large, first fold height and a relatively small, second fold height.

4. The filter module as claimed in claim 2,
wherein, in a circumferential direction of the annular gap, the fold and counter-fold arrangement within each fold group has a sequence as follows: a fold of a first fold type, a fold of a second fold type, the counter-fold, and a further fold of the second fold type.

5. The filter module as claimed in claim 2,
wherein, in a circumferential direction of the annular gap, the fold and counter-fold arrangement within each fold group has a sequence as follows: a fold of a second fold type, a fold of a first fold type, the counter-fold, and a further fold of the first type.

6. The filter module as claimed in claim 2,
wherein, in a circumferential direction of the annular gap, the fold and counter-fold arrangement within each fold group has a sequence as follows: a fold of a second fold type, a fold of a first fold type, and the counter-fold.

7. The filter module as claimed in claim 1,
wherein the folds are subdivided into three fold types of mutually differing fold height to form a fold and counter-fold arrangement.

8. The filter module as claimed in claim 7,
wherein the three fold types of mutually differing fold height consist of a largest, first fold height, a medium, second fold height and a smallest, third fold height.

9. The filter module as claimed in claim 7,
wherein, in a circumferential direction of the annular gap, the fold and counter-fold arrangement within each fold group has a sequence as follows: a fold of a first fold type, the counter-fold, a fold of a third fold type, and a fold of a second fold type.

10. The filter module as claimed in claim 7,
wherein, in a circumferential direction of the annular gap, the fold and counter-fold arrangement within each fold group has a sequence as follows: a fold of a second fold type, a fold of a third fold type, the counter-fold, a further fold of the third fold type, and a fold of a first fold type.

11. The filter module as claimed in claim 7,
wherein, in a circumferential direction of the annular gap, the fold and counter-fold arrangement within each fold group has a sequence as follows: a fold of a second fold type, a fold of a third fold type, a fold of a first fold type, a further fold of the third fold type, and the counter-fold.

12. The filter module as claimed in claim 1,
wherein the folds are subdivided into four fold types of mutually differing fold height to form a fold and counter-fold arrangement.

13. The filter module as claimed in claim 12,
wherein the four fold types of mutually differing fold height consist of a largest, first fold height, a relatively large, medium, second fold height, a relatively small, medium, third fold height and a smallest, fourth fold height.

14. The filter module as claimed in claim 12,
wherein, in a circumferential direction of the annular gap, the fold and counter-fold arrangement within each fold group has a sequence as follows: a fold of a second fold type, a fold of a third fold type, a fold of a first fold type, a fold of a fourth fold type, and the counter-fold.

15. The filter module as claimed in claim 1,
wherein all of the counter-folds are equal to one another in height.

16. The filter module as claimed in claim 1,
wherein a fold height of a fold type having a largest fold height in the fold group is less than or equal to the width of the annular gap.

* * * * *